June 26, 1928.

B. McCOLLUM 1,675,121

METHOD AND APPARATUS FOR STUDYING GEOLOGIC CONTOURS

Original Filed Aug. 14, 1922

Burton McCollum

INVENTOR.

Patented June 26, 1928.

1,675,121

UNITED STATES PATENT OFFICE.

BURTON McCOLLUM, OF WASHINGTON, DISTRICT OF COLUMBIA.

METHOD AND APPARATUS FOR STUDYING GEOLOGIC CONTOURS.

Application filed August 14, 1922, Serial No. 581,867. Renewed March 5, 1928.

My invention relates to methods of determining the contour of subterranean strata or boundaries of geologic formations, and has among its objects the study of the geological conditions at depths that can not be conveniently and economically reached by ordinary means. In particular I have found that by the use of my invention it is possible to determine the location of deposits of various ores, mineral oils, and other valuable materials. My invention depends on the well known principle that if a train of sound waves be transmitted through the earth, partial reflection of the sound takes place at the boundary between any two masses which differ in respect to certain of their physical properties. By properly utilizing the transmitted and reflected waves I am able to determine accurately the location, shape, and extent of such boundaries, which information is of great value for the purposes stated above. My invention is further described in the following specifications, reference being made to the accompanying drawings.

For the sake of clearness and brevity my invention is described below with particular reference to but one of its practical applications, namely, the location of deposits of mineral oils and natural gases. It will readily be seen, however, that the method may be applied to determining the location of many other kinds of mineral deposits.

Figure 1:
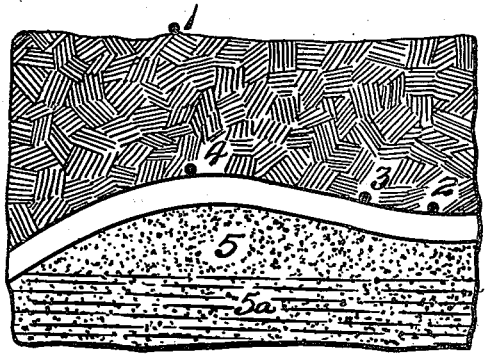
Fig. 1 is a diagram showing the relation between the contour of subsurface strata and the occurrence of certain valuable mineral deposits.

It is well known that in regions where deposits of oil and gas may be encountered the deposits are not distributed generally throughout the area, but are highly localized in pools occupying a relatively small portion of the total potential oil bearing area. The location of these pools is governed by a well known principle illustrated in Fig. 1. In this figure, (1) is the surface of the ground and (2) a dense subterranean stratum of irregular contour concave upward at (3) giving a synclinal fold, and convex upward at (4) giving an anticlinal fold. It is well known that in a potential oil bearing region the oil and gas accumulate locally at (5) under the anticlinal fold (4), it being forced upward into this position by the heavier salt water stratum (5ª) beneath it. The problem of locating a pool of oil in a potential oil bearing region is therefore, one of determining the location of these anticlinal folds in the subterranean rocks. This latter, as stated above, is one of the objects of my invention.

Figure 2:
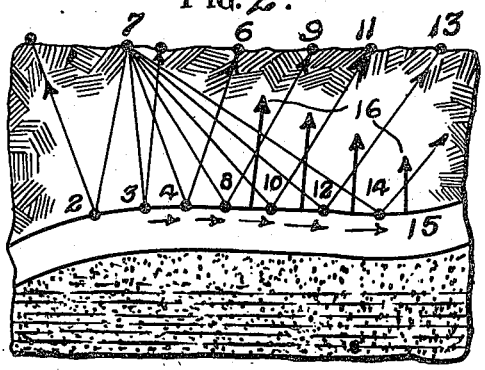
Fig. 2 shows in principle a method that has heretofore been proposed, but never successfully used for accomplishing the object here sought, and illustrates some of the disturbing physical phenomena which have heretofore prevented a successful application of the method.

Heretofore, numerous investigators have endeavored to determine the contour of subterranean strata by the use of sound waves reflected from them, but up to the present time none of these methods has been successful. Fig. 2 shows in diagrammatic form one of the methods that has heretofore been tried in attempts to utilize this principle, and illustrates the difficulties that have prevented a successful application. In their fundamental principles these methods have all comprised a source of sound (7), which has heretofore always been placed either on or below the surface of the earth. The theory is that sound travels out radially in all directions, and is in part reflected from the boundary 2, 3, 4, 8, 10, and 12, the part of the wave incident at (4) being reflected to the point (6), that part incident at (8) being reflected to the point (9), and so on. If now, a receiving device be placed at the point (6) for example, it will be evident that two waves will affect it, namely the direct wave transmitted along the surface of the earth from the source (7) and the reflected wave from the point (4). If now, the distance in a direct line from the point (7) to the point (6) differs from the distance to the point (6) by way of point (4) by an amount equal to a half wave length, or any odd multiple thereof, the direct and reflected wave trains will arrive at the point (6) in opposite phase, so that the intensity of the resultant wave at the point (6) will be diminished. If, on the other hand, the difference in these two distances is equal to any even multiple of a half wave length, the intensity of the resultant wave will be increased. If the source (7) be kept stationary and the receiver at (6) be moved from point to point along the surface it should be theoretically possible by the location of the resulting nodes, the known frequency of sound from the source, and the velocity of sound in the earth, to determine the depth of the reflecting surface. The same thing can be accomplished by keeping the receiver (6) at a fixed point, and varying the velocity of the source, thus giving rise to beats in the receiver. Serious difficulties of a practical nature prevent the realization of this simple set of conditions. In the first place a source of sound having a wave front with a relatively short radius of curvature such as would be the case if the source were placed on or near the surface of the earth, will on reflection from a subsurface stratum a short distance below give rise to two sets of reflected waves, namely, a compression wave and a transverse wave. These two waves travel with different velocities, and hence will reach the receiver located at the point (6) at different times, thus causing great confusion in the determination of nodes or beats. Furthermore, the velocity of sound in the rock layer (2) is practically always much greater than in the surface strata. On this account when the slowly travelling sound wave reaches the nearest point as at (3) of the reflecting rock layer, a sound wave of relatively high velocity moves along the rock layer as shown by the arrows (15) and all the while a portion of the energy of the wave is being diffracted upward into the overlying strata as indicated by the arrows (16), and this diffracted energy moves upward and may reach the receiver at the point (9) before the arrival of the true reflected wave from the point (8), since this latter, although travelling by a somewhat shorter path, must travel all the way through the medium of low velocity. Furthermore, it will be seen that this initial diffracted disturbance arriving at (9) will be immediately followed by others caused by the transmitted wave striking portions of the rock layer (2) at other points, so that a continuous train of diffracted disturbances will be detected at (9) which will completely obscure any nodes or beats resulting from the true reflected waves. It might appear that this trouble could be obviated by bringing the receiver very close to the source (7). When this is done, however, it will be seen that owing to the inverse square law of propagation of sound waves, the intensity of the direct wave at the receiver will become relatively very great in comparison with that of the reflected wave, and if the receiver is brought close enough to the source to avoid the difficulties above mentioned, the reflected wave will become relatively too feeble to produce appreciable beats in the receiver.

I have now invented a very simple expedient whereby the foregoing troubles can be entirely obviated. I accomplish this end by placing the detector or the source, preferably the latter, high up in the air, and so arranging the two that the direction of the reflected waves reaching the detector makes only a very small angle with the direction of the transmitted waves, preferably not more than a few degrees. By keeping this angle small, the diffraction disturbances are avoided and by placing the source at a considerable elevation above the surface of the earth the difficulties due to the relatively great intensity of the direct transmitted wave as compared to the reflected wave are eliminated.

Figure 3:
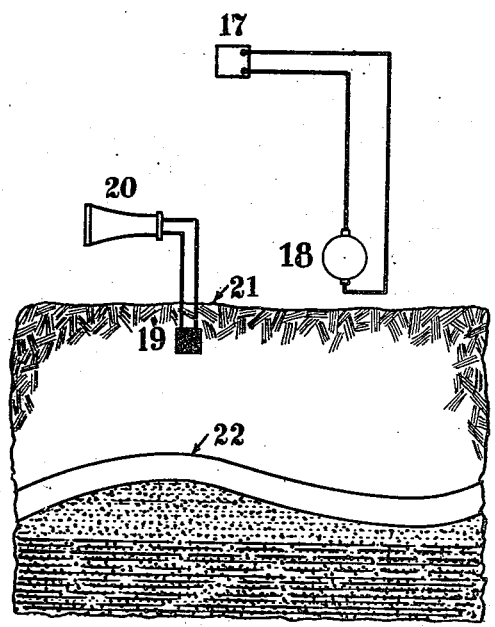
Fig. 3 shows in diagrammatic form a practical embodiment of my invention whereby I avoid the difficulties heretofore encountered.

My invention will be clearly understood by reference to Fig. 3. The source of sound (17) is placed high up in the air by means of a balloon or airplane or other device. This source may be of any suitable kind adapted to give a continuous wave train, such as an electrically driven vibrator. This source may be actuated by an alternating current generator (18) adapted to produce a sound wave train, the frequency of which can be controlled at will. Approximately below the source (17) and either on or below the surface of the earth, I place a detector (19) which may be of any type such as a microphone, piezo-electric crystal, or electromagnetic detector. Wires extend from this detector to a receiver (20) which may be any one of a number of well known types. It will be evident that when the sound wave from the source (17) strikes the surface of the earth (21) a considerable part of the energy of the wave train will be reflected and pass off into space. A part, however, will be transmitted to the earth, this portion immediately producing an effect on the detector (19) and this in turn produces a sound in the receiver (20). The wave then travels downward until it strikes the first reflecting surface (22) where a part of its energy is reflected upward to the surface of the earth, where it again affects the detector. It will be evident that if the depth of the reflecting stratum below the detector (19) is an odd multiple of a quarter wave length, the direct wave and the reflected wave will arrive at the detector in opposite phase, thereby producing a diminution in the intensity of the sound in the receiver. If, on the other hand, the depth of the reflecting stratum is an even multiple of a quarter wave length, the two waves will arrive at the detector in phase with each other, thus producing an amplification of sound in the receiver. Since from the well known law of acoustics above mentioned that the maximum sound in the receiver will be obtained when the depth of the reflecting surface is an even multiple of a quarter wave length, it follows that if we adjust the frequency at random to give any particular point of maximum the following relations will hold:

$$D = \frac{n l_1}{4} \quad (1)$$

where D is the depth of the reflecting surface, $n$ is the number of quarter wave lengths, and $l$ is the length of the wave. If now we gradually increase the frequency until we pass through a minimum and again to the next succeeding maximum, the following relationship holds:

$$D = (n+2)\frac{l_2}{4} \quad (2)$$

Since the D of Equation (1) is the same as that of Equation (2) we will have $$(n+2)\frac{l_2}{4} = n\frac{l_1}{4} \quad (3)$$

Solving this equation we have $$n = \frac{2 l_2}{l_1 - l_2} \quad (4)$$

Further, if we know the velocity of sound in the medium, together with the frequency of the sound wave train, both of which can be determined by means too well known to require description here, the value of $l_1$ in Equation (1) will become known, since $l_1$ equals the velocity divided by the frequency. Since now $n_1$ and $l_2$ are readily determinable, D may obviously be calculated from equation (1). It will further be evident that if the depth of the reflecting surface be determined at a sufficient number of places, the contour of this surface will be known.

The velocity of sound in the overlying subsurface stratum under investigation can be determined independently by any well known means such as by measuring the time interval between the departure of a sound wave from a source of known position, and the arrival of the wave at a receiving station a known distance from the source, or by measuring the difference in time of arrival of a sound wave at two receiving stations a known distance apart. In making this velocity measurement, it is desirable to measure the velocity in a direction substantially at right angles to the surface of the earth, since the velocity in this direction may differ from the velocity at right angles thereto. The frequency of the wave train may be conveniently measured at any time by means well known to physicists, the measurement being made either directly on the sound wave or by measuring the frequency of an electric current producing the wave or of an electric current produced by the wave in a receiving circuit.

It will be quite evident that with this arrangement of apparatus the effects on the detector of any diffracted waves, such as those described above, will be eliminated. Furthermore, if the source of sound (17) be placed high enough up in the air so that the wave striking the earth is substantially a plane wave, it will be apparent that there will be no transverse waves set up on reflection from the subsurface stratum. We then have to deal with only a simple wave train of compression waves, so that the beats produced in the receiver will be clearly discernible.

Figure 4:
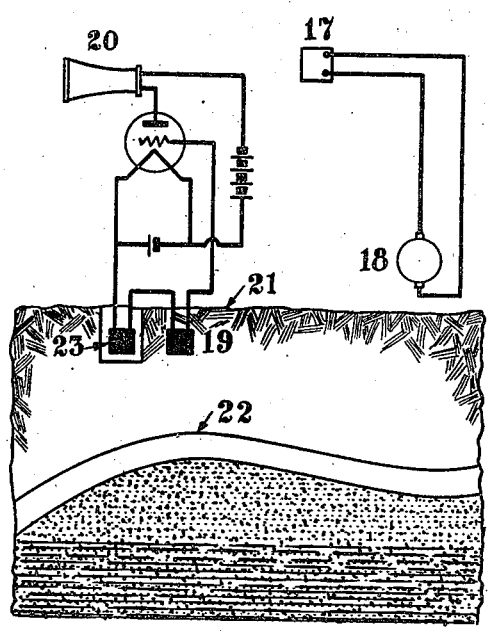
Fig. 4 shows an arrangement of sound receiving devices which I have found particularly useful in practical embodiments of my invention.

A further advantage of putting the source high up in the air has to do with the relative intensity of the direct and reflected waves actuated by the detector. It will be seen that the sound wave train emanating from the source (17) travels out spherically in all directions, and the intensity of the wave at any point is governed by the inverse square law. Suppose, for example, that the height of the source (17) above the detector (19) is equal to the depth of the reflecting surface (22). In that event when the sound wave reaches the detector (19) it has a certain intensity. Suppose now, that 100% of the energy of the wave train which enters the earth, is reflected back from the reflecting surface (22). It will be evident that when the reflected wave front has travelled back again to the detector (19) the total distance which it will have travelled from the source (17) will be three times as great as the distance traversed by the direct wave in going from the source (17) to the detector (19). The intensity of the reflected wave when it reaches the detector would therefore be only one-ninth of the intensity of the direct wave at the same point. If, as is practically always the case in practice, only a small fraction of the energy is reflected from the surface (22) the intensity of the reflected wave becomes still further reduced. It will be evident, therefore, that the reflected wave will be so small that any beats produced in the receiver will be extremely small, and therefore difficult of detection. In general, it will be necessary to take steps to increase the amplitude of the reflected wave, relative to that of the direct wave. One means of accomplishing this is by putting the source of sound very high up in the air. As will be seen from the example given above, if the depth of the stratum is substantially equal to the height of the source, then assuming 100% reflection, the intensity of the reflected wave at the detector (19) will be only one-ninth of the intensity of the direct wave. Suppose, however, that a source be put to a height above the detector of say five times the depth of the reflecting stratum under study. In that case the reflected wave travelling back to the detector will have travelled about 40% further from the source than the direct wave, when the two pass the detector. Applying the inverse square law, it will be seen that in this case, still assuming 100% reflection, the intensity of the reflected wave at the detector will be approximately one-half of that of the direct wave, as compared with the ratio one-ninth when the source is placed at the lesser elevation. It will therefore be seen that by putting the source very high in the air in comparison with the depth of the stratum under investigation, it will be possible, because of the inverse square law of propagation of sound waves, to increase greatly the intensity of the reflected wave in comparison with that of the direct wave. In practice, I prefer to elevate the source to a height at least as great as the depth of the reflecting stratum, and preferably to several times this height. Another method which I have devised, for reducing the amplitude of the direct wave in comparison with the reflected wave is shown in Fig. 4. It is well known that because of the very great difference in the acoustic properties of earth and air, a sound travelling either in the air or in the earth reaching the surface of the earth will be nearly all reflected back into the medium in which it is travelling. Thus, as pointed out above, the wave coming from the source (17) up in the air has most of its energy reflected at the surface of the earth, back again into the air. Similarly, that part of the energy which goes into the earth and is reflected back toward the surface of the earth from the reflecting surface (22) will, on arrival at the surface of the earth be again reflected downward, only a small fraction of its energy returning again to the air. By taking advantage of this principle, I am able to reduce the intensity of the effect of the direct wave on the detector to any desired degree without materially reducing the intensity of the reflected disturbance. This is accomplished by the use of a receiving device as shown in Fig. 4. Here a sound detector (19) is placed in the earth as previously described, in which case it is actuated only by that part of the sound energy passing into the earth. The second detector (23) is placed to be responsive to the direct air wave to a much greater degree than to the reflected ground wave, and very close to the detector (19). The two detectors are so disposed that a sound wave coming from the source (17) will reach them in exactly the same phase. In order to make clear the method of functioning of this arrangement, let us assume that the sensitivity of the detector (23) bears to the sensitivity of the detector (19) the same numerical ratio as the sound energy transmitted to the earth bears to the total sound energy incident on the surface of the earth from the source (17). In that case it is obvious that the total effect produced on the detector (23) will be just equal to the total effect produced on the detector (19) due to the direct wave coming from the source (17). Consider now, what happens when the reflected wave arrives again at the surface of the earth after having been reflected from the surface (22). This wave, travelling to the earth, exerts its full effect on the detector (19) embedded in the earth, but on reaching the surface nearly all of its energy is again turned back in a downward direction, only a small fraction of it being transmitted to the air, where it can affect the detector (23). It will be evident, therefore, that the effect of the reflected wave will be enormously greater on the detector (19) than it will be on the detector (23), whereas, the effect of the direct wave on the two detectors will be substantially equal. If now, the two detectors (19) and (23) are coupled together in such manner as to tend to neutralize each other as regards their effect on the recording device, then the direct wave will produce no resultant effect in the receiver, provided the two detectors are adjusted to give equal and opposite responses, whereas, the reflected wave will produce substantially its full effect on the detector (23) without affecting appreciably the detector (19). In practice I prefer not to completely eliminate the effect of the direct wave in the receiver, but to adjust the detectors (19) and (23) so that there will be a slight resultant effect in the receiver due to the direct wave, this resultant effect being only a small fraction of the effect produced on either instrument alone. It will be seen, therefore, that by proper adjustment of the relative sensitivity of the two detectors in Fig. 4, the relative loudness of the sound produced in the receiver by the direct and reflected waves can be controlled to any desired extent, thus bringing out the beats very clearly, even though only an extremely small fraction of the energy of the wave is reflected from the subsurface stratum. In practice, either one of the above described means for controlling the relative intensity of the effects of the direct and reflected waves may be used, but I prefer to use both of them in combination. As stated above, I have found that any one of the usual types of receiving devices may be used. I prefer, however, to use a piezoelectric crystal or a pair of such crystals, coupled in opposition to each other, and connected to the grid of an electron tube amplifier.

Certain of the broader aspects of my present invention are not herein claimed, but are claimed in my application Serial Number 581,866, filed August 14, 1922.

I claim:

1. In the art of determining the contour of a subsurface stratum, the method which comprises producing a train of sound waves at a distance above the surface of the earth, detecting the waves transmitted to and reflected from said stratum, varying the frequency of the sound waves to produce beats, and determining the depth of said stratum from the velocity of sound in the earth overlying said stratum and from the change in frequency required to produce said beats.

2. In the art of determining the contour of a subsurface stratum, the method which comprises producing a train of sound waves at a distance above the surface of the earth, subjecting a receiving device in contact with the earth to the effect in a certain degree of the direct waves and to the effect in lesser degree of waves reflected from said stratum, varying the frequency of said waves to produce beats in the indications produced by said receiving device, determining the velocity of sound in the earth overlying said stratum, and determining the depth of said stratum from the measured velocity and the change in frequency required to produce said beats.

3. In the art of exploring subterranean regions, the method which comprises transmitting a train of sound waves to a subterranean formation to be reflected therefrom, producing beats by the direct and reflected waves, and translating the beats into indications.

4. In the art of exploring subterranean regions, the method which comprises producing at a distance above the surface of the earth a train of sound waves transmitted to and reflected from a subterranean formation, detecting at a point adjacent substantially identical paths in which the direct and reflected waves are transmitted the beats resulting from the direct and reflected waves, and translating said beats into indications.

5. In the art of exploring subterranean regions, the method which comprises transmitting a train of sound waves to a subterranean formation to be reflected therefrom, producing opposing effects by the direct waves, utilizing one of said effects to produce beats by the direct and reflected waves, and translating said beats into indications.

6. In the art of exploring subterranean regions, the method which comprises producing at a distance above the surface of the earth a train of sound waves transmitted to and reflected from a subterranean formation, producing at points adjacent substantially identical paths in which the direct and reflected waves are transmitted a plurality of opposing effects of the direct waves, utilizing one of said effects to produce beats, and translating said beats into indications.

7. In a system for determining the contour of a subsurface stratum and comprising a source of a train of sound waves and a sound receiving device, the method which comprises disposing the source of a train of sound waves a substantial distance in the air above the surface of the earth, varying the frequency of the sound wave train, disposing the receiving device in contact with the earth, and determining the time interval between actuation of said receiving device by the direct wave train from the source of sound waves and a reflected wave train from the subsurface stratum.

8. In a system for determining the contour of a subsurface stratum and comprising a source of a train of waves, and a sound receiving device, the method which comprises disposing the source of sound waves in the air above the surface of the earth at a distance greater than the depth of the subsurface stratum below the surface of the earth, varying the frequency of the sound wave train, placing the receiving device in contact with the earth, and determining the time interval between actuation of the receiving device by the direct wave train from the sound source, and a reflected wave train from the subsurface stratum.

9. In a system for determining the contour of a subsurface stratum comprising a source of a train of sound waves, and a pair of sound detectors, the method which comprises the steps of disposing the source of sound waves a substantial distance above the surface of the earth, placing one of the detectors in contact with the earth, and positioning the other of the sound detectors closely adjacent the other detector and substantially effectively out of contact with the earth whereby it will be actuated by the direct wave train from the sound source substantially to the same extent as the other of said detectors and only slightly actuated relative to the first of said detectors by a reflected wave train.

10. In a system for determining the contour of a subsurface stratum comprising a source of a train of sound waves, and a pair of sound detectors, the method which comprises the steps of disposing the source of sound waves a substantial distance above the surface of the earth, placing one of the detectors in contact with the earth, positioning the other of the sound detectors closely adjacent the other detector and substantially effectively out of contact with the earth whereby it will be actuated by the direct wave train from the sound source substantially to the same extent as the other of said detectors and only slightly actuated relative to the first of said detectors by a reflected wave train, and coupling said detectors in such relation that the effects of the direct wave train upon the detectors will tend to neutralize each other.

In testimony whereof I affix my signature.

BURTON McCOLLUM.